United States Patent [19]
Free et al.

[11] Patent Number: 6,076,399
[45] Date of Patent: Jun. 20, 2000

[54] LEVEL SWITCH FILTER FOR SEWER BASIN

[75] Inventors: Dan G. Free, Sidney; Mark Kowalak, Kettering; Brian Mitsch, Bradford, all of Ohio

[73] Assignee: Crane Pumps & Systems, Inc., Piqua, Ohio

[21] Appl. No.: 08/961,351

[22] Filed: Oct. 30, 1997

[51] Int. Cl.[7] .............................. E03B 7/07; G01F 23/00
[52] U.S. Cl. .................... 73/304 R; 73/304 C; 137/544; 137/550
[58] Field of Search ................. 340/607, 608; 137/544, 545, 550; 73/304 R

[56] References Cited

U.S. PATENT DOCUMENTS

| | | | |
|---|---|---|---|
| 5,044,566 | 9/1991 | Mitsch | 241/46.04 |
| 5,138,881 | 8/1992 | Riley et al. | 73/304 R |
| 5,545,318 | 8/1996 | Richmond | 210/232 |
| 5,553,794 | 9/1996 | Oliver et al. | 241/36 |
| 5,587,074 | 12/1996 | Lynch et al. | 210/411 |
| 5,627,523 | 5/1997 | Besprozvanny et al. | 340/623 |
| 5,861,811 | 1/1999 | Lease et al. | 340/608 |

*Primary Examiner*—Hezron Williams
*Assistant Examiner*—Dennis Loo
*Attorney, Agent, or Firm*—Oldham & Oldham Co., LPA

[57] ABSTRACT

A sewer basin has a tube mounted longitudinally in the basin to isolate the level sensing elements from particulate and non-soluble materials present in the basin which could contaminate the elements, which are used for selectively activating a pump in the basin. The liquid level in the tube is kept in equilibrium with the liquid outside of the tube by an aperture below the normal low liquid level. A filter is provided in the tube between the aperture and the level sensing elements. The filter is formed by a stack of filter elements mounted on an axial post extending into the tube from a bottom end cap. The elements are limited in their axial mobility on the axial post.

19 Claims, 2 Drawing Sheets

LEVEL SWITCH FILTER FOR SEWER BASIN

The present invention relates to a filter intended to protect the liquid level switches in a sewer system, especially a basin in such a sewer system. More particularly, the present invention relates to a level switch isolation tube containing a filter element positioned between the switch elements and an inlet allowing fluid flow into the isolation tube.

BACKGROUND OF THE ART

In a sewage pumping station, it is necessary to provide the pump with at least one activation switch for turning power to the pump on and off, depending on the fluid level in the sewage basin. The sewage and effluent which enters the basin contains solids and non-solubles, such as greases. If these materials enter the activation switches, they can render the switch inoperable, resulting in failure of the pump to properly control liquid level in the basin. It is known to provide an isolation tube in the basin. Such an isolation tube is positioned in the basin with its axis essentially parallel to the longitudinal axis of the basin and seated on the bottom of the basin. A small opening provided at the lower end of the isolation tube allows liquid communication between the inside and the outside of the isolation tube, so that the liquid level inside the tube tracks that outside the tube. By maintaining a certain minimum level of liquid in the basin, as through setting the off level of the pump at a minimum level above the basin bottom, the opening in the isolation tube may be kept below the liquid surface at all times. By doing this, the entry of floating solids and non-solubles into the interior of the isolation tube may be generally prevented. However, the isolation tube is not the perfect solution and there are known failure modes.

For example, non-solubles such as grease which enter the basin are not always solid or even semi-solid and may be broken up into small globules by the turbulent flows present in the basin from time to time. The turbulent pull of such globules below the liquid surface may result in entry into the isolation tube interior though the opening. Although an isolated entry of a small amount of the grease into the isolation tube may not be a major problem by itself, the general lack of turbulence within the isolation tube and the relative proximity of the surfaces will often result in the greases being coated out on the walls of the tube and on the switch elements. If this grease builds up through repeated occurrences, the switch elements may become inoperable. Also, small solids are easily entrained in the same turbulences and drawn into the isolation tube, where they may become trapped, if the aperture connecting the interior and exterior of the isolation tube is large. Repairs of the level control switch elements due to contamination are costly and inconvenient.

SUMMARY OF THE INVENTION

It is therefore an object of the present invention to provide an isolation tube for a sewage basin which effectively prevents the non-solubles and suspended solids from nearing the switch elements interior thereto, thereby extending the time between maintenance calls where a switch element must be cleaned or replaced due to contamination. This and other objects of the invention are achieved improvements to a sewage basin. Such a basin has a pump mounted in the basin for evacuating liquid from the basin, and a system for maintaining the liquid level between a low level point and a high level point within the basin. The system usually comprises at least two liquid level sensors placed in a tube disposed in the basin with a longitudinal axis of the tube parallel to a longitudinal axis of the basin such that the tube spans at least the distance between the low level point and the high level point. The tube has an aperture in the tube below the low level point to permit liquid flow between the basin and the tube. A filter is also positioned in the tube above the top of the aperture and below the low level point. The first of the at least two sensors actuates a switch to turn the pump off and the second of the least two sensors actuating a switch to turn the pump on. The tube has its longitudinal axis substantially parallel to a longitudinal axis of the basin such that the tube spans at least the distance between the low level point and the high level point, with the first and second liquid level sensors positioned within the interior of the tube. In some applications, used rather rarely, the isolation tube may contain a single level sensor which performs both the "on" and "off" functions, but this is not favored. However, the present invention will find operative use with such an isolation tube using a single level sensor.

Even further aspects of the invention will be understood by reference to the detailed description of the invention.

BRIEF DESCRIPTION OF THE DRAWINGS

The present invention is best understood when reference is made to the accompanying drawings, wherein identical parts are identified by identical reference numerals, and wherein.

DETAILED DESCRIPTION OF THE INVENTION

Figure 1:
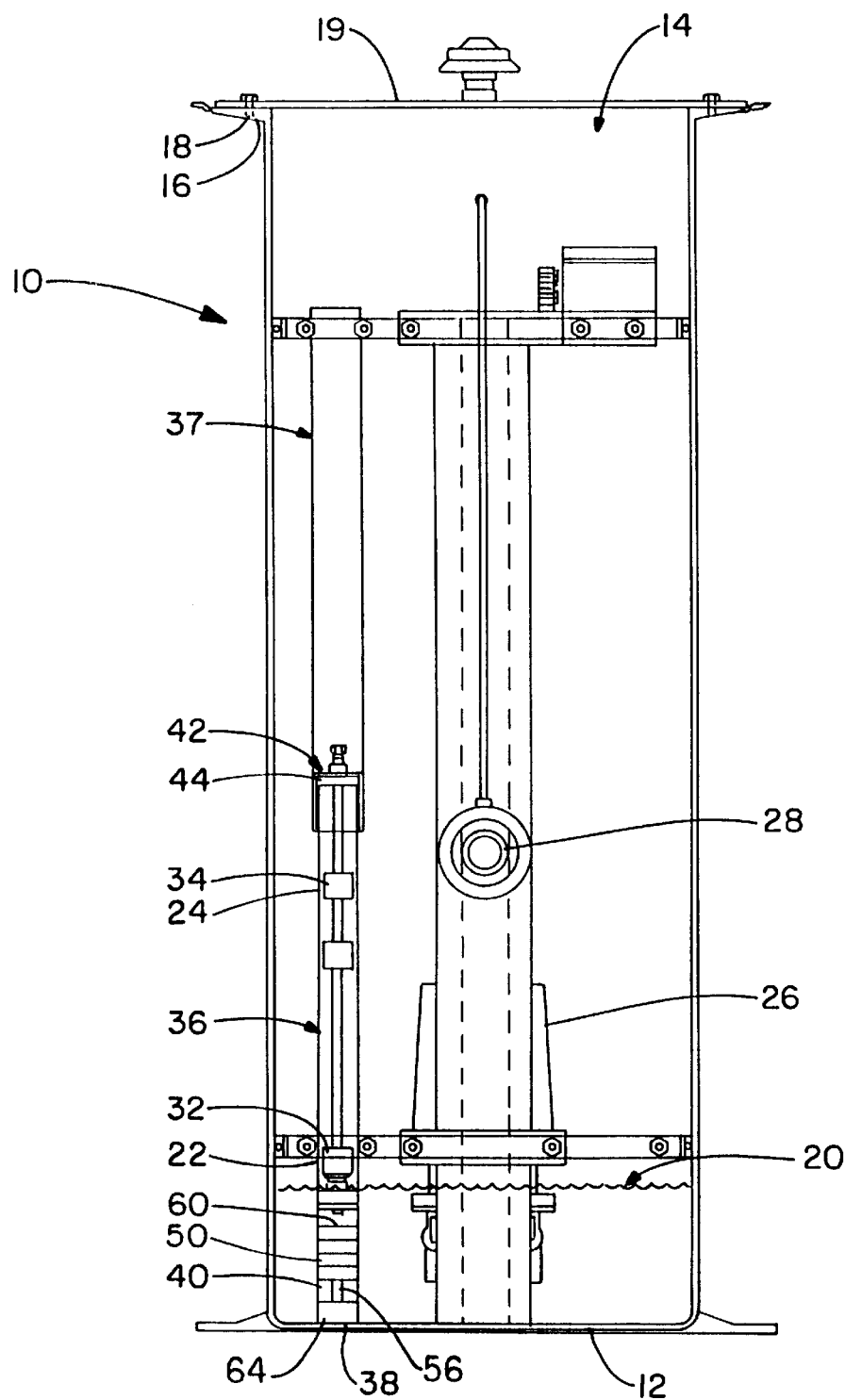
FIG. 1 is a side sectional view of a sewer basin incorporating the present invention.

The present invention is shown in a side sectional view in FIG. 1. A sewer basin 10, as is generally known in the prior art, is provided as a part of a system to pump untreated sewage or effluent on its way from a collection point to a treatment plant. The basin 10, preferably cylindrical, has a closed bottom end 12 and an open top end 14. A flanged exterior periphery 16 of the basin at the top end 14 is provided with apertures 18 of the like for affixing a basin cover 19. The basin 10 is conventionally situated so that the top end 14 is at grade level or slightly above, although if the basin is positioned above grade, that change would not affect the operation of the present invention. Sewage, which may contain suspended solids as well as non-solubles, such as greases and the like, conventionally enters the basin 10 through an opening (not shown) in the side wall of the basin and a portion 20 of the sewage entering the basin is usually retained within the basin so that the vertical height of the sewage in the basin is kept controlled between a low level point 22 and a high level point 24 by level sensors, as will be described further below.

The task of evacuating sewage from the portion 20 maintained in the basin falls upon a pump 26, which is usually removably mounted in the basin near the bottom, particularly completely or partially submerged in the retained sewage portion 20. Pump 26 may be a standard impeller type pump, but if the service to which it is likely to be subjected has sufficient amounts of the suspended solids and non-solubles mentioned above, it will be more likely that the pump will be of the grinder variety. This latter type of pump is well known in the prior art and is described in a number of United States patents, including one (U.S. Pat. No. 5,044,566) invented by one of the present inventors, although that patent is not commonly owned with the present invention. Sewage from portion 20 drawn into the intake side of pump 26 is discharged at a higher pressure through discharge line 28, which is interconnected with a further portion of the overall sewage removal and treatment system. Pump 26 will be provided with a motor and will be externally powered from a power source, which is usually positioned at or near a control system. Because pump 26 is relied upon to maintain the liquid level in basin 10 between the low and high level points 22, 24, a level sensing and control system, indicated generally as 30, will be provided and interlinked with the controls for pump 26. At the minimum, the level sensing and control system 30 will comprise a first, or low, liquid level sensor 32 which, when activated, will turn off power to the pump 26 and a second, or high, liquid level sensor 34 which, when activated, will turn on power to the pump, causing removal of sewage and lowering of the level of sewage in the basin. It will be understood by those familiar with this art that a single level sensor moving between the low and high level points 22, 24 is occasionally used, and that the present invention will be operative when used with such a single sensor, but this embodiment is not usually favored. Although not necessary to the present invention, it will also be customary to provide a third liquid level sensor for the purpose of setting off an alarm when the liquid level in the basin reaches a level significantly above the high level point 24. This will generally occur when the inflow of sewage to the exceeds the ability of the pump to discharge the sewage, as particularly when there is a loss of power to the pump or a failure of the high level sensor to actuate the pump. It is also possible that the basin may be pumped dry in the event that the low level sensor 32 fails to turn off the pump, but this latter contingency is often not provided for by an alarm. In some situations, a second low level control may be added to create a redundant "off" sensor to ensure that the pump will turn off as required.

The specifics of the low and high level sensors 32, 34 as used in the sewage systems incorporating the present invention are generally not of critical importance, because the present invention is believed to be operative with any of the known sensors. However, it is noted that a variety of different types of sensors are used in the industry. For example, U.S. Pat. No. 5,553,794 (Sep. 10, 1996) to Oliver has a level detector tube in which detector bands on the tube are conductive so that conductance of a circuit is increased when liquid contacts the band. The liquid level is thus detected by a change in capacitance that occurs in the presence of liquid. In another sort of level detector, a body which seeks to float on a liquid surface due to its density may move up and down on a vertical member to make or break an electrical contact.

Because basin 10 receives sewage containing suspended solids and non-solubles which could disrupt operation of the level sensors 32, 34, the basin 10 may be provided with an isolation tube 36. Such a tube 36 is preferably cylindrical with a internal diameter at least an order of magnitude smaller than the internal diameter of the basin 10 and a height less than the height of the basin, so that the tube may be easily and non-obtrusively placed in the basin. A typical isolation tube of this sort is about 12 to 18 inches long with an outside diameter of about 2.5 inches. The preferred placement of the isolation tube 36 is to place a first end 38 of the tube at or near the closed bottom end 12 of the basin 10. In the embodiment of the invention shown in FIG. 1, the tube 36 is inserted into the basin 10 through a slightly larger tube 37 which holds tube 36 in an upright manner while it rests on the bottom end 12. The isolation tube 36 should be positioned in the basin 10 so that a longitudinal axis of the tube lies substantially parallel to the longitudinal axis of the basin. An opening 40 is provided in the isolation tube 36 near the first end 38 for allowing liquid communication between the general interior of the basin with the interior of the isolation tube. As shown in FIG. 1, the opening 40 may be circular, but it may also have other shapes, such as an elongate slot, especially a vertically-oriented elongate slot which is aligned with the axis of the tube. This type of elongate slot allows for the area of the opening to be sufficiently large to permit free flow of liquid while generally precluding entry of particles larger than the opening width to the tube interior through the opening, unless the particle happens to be particularly oriented. The larger opening may also have some advantage in minimizing the risk of a particle completely obstructing the opening. The opening 40 is positioned so that its uppermost edge is vertically below the low level point 22. In this manner, fluid entering through the opening 40 must pass upwardly before it could possibly encounter the low level sensor 32. The tube 36 is selected to have sufficient height so that a top end 42 of the tube extends above the high level point, or in the case that a third liquid level sensor is used to set off an alarm or the like upon imminent flooding of the basin, the tube 36 should have sufficient height so that the top end extends above the third or alarm point. From this, it will be understood that the top end 42 of the tube 36 will normally be out of the liquid portion 20 maintained in the basin and the exterior of the tube should be exposed to the ambient gases in the basin. While it is certainly preferred to maintain the top end of the tube in a closed condition, it will be immediately recognized that the failure to provide an aperture 44, albeit a small one, to communicate the interior of the tube with the exterior of the tube will prevent the liquid levels inside and outside of the tube from maintaining a substantial equilibrium.

A primary feature of the present invention is now disclosed. A filter 50 is positioned inside the isolation tube 36 along the length of the tube, but below the low level point 22. In the preferred embodiments, the filter 50 is a plug-like cylindrical body comprising a coarse mesh material. A variety of acceptable materials, including polymers or even natural sponge, will be known, with a primary objective to the filter being to provide a tortuous path for any suspended solids or non-solubles which enter the interior of the isolation tube, particularly grease globules which may readily pass through aperture 40. In some embodiments, the filter 50 may be inserted directly into the interior of the tube 36, so that the filter substantially fills the interior cross section of the tube along the length of the filter, which does not allow any significant bypassing of fluid in the tube via an annular space which could exist between the filter and the inside wall of the tube. A sliding fit of the filter in the tube, for example, would be quite appropriate. In some embodiments of the invention, the filter is effectively restrained from any axial motion within the isolation tube 36. This would generally be accomplished by the inclusion of a detent means in the interior of the tube. In other embodiments, the filter has its axial mobility restrained by detent means in the tube interior so that only a limited range of axial motion is allowed. Particularly, it is important that the filter 50 be kept below the low level point 22, so that it does not interfere with proper functioning of the low level sensor 32. It is also important that the filter not be able to move downwardly in the tube to a point where any part of the aperture 40 is above the top of the filter 50. If this would occur, liquid entering through the aperture 40 above the top of the filter 50 would not be filtered and grease and the like would find its way to the sensors 32, 34. Although not required, in some circumstances it would be permissible to allow a lower portion of the filter 50 to move below the top of the aperture 40. In the most preferred embodiment, the filter will have a height less than the distance between the top of the aperture 40 and the low level point 22. Such a preferred filter will be axially restrained so that its top end does not go above the low level point and its lower end does not go below the bottom of the aperture.

It is well known in the filter art that the performance of a filter increases as the filter becomes somewhat obstructed, since the presence of captured material in the filter increases the tortuosity of the filter. Additionally, the presence of non-solubles such as grease in the filter presents an increased opportunity for accretion of small globules into larger globules. The digestive activity of bacteria naturally present in sewage will provide a means for removing grease and other digestible wastes from the filter. To the extent that the filter provides an increased surface area with a suitable texture for establishing a habitat for the bacteria, this natural cleaning capacity of the bacteria may be optimized.

Figure 2:
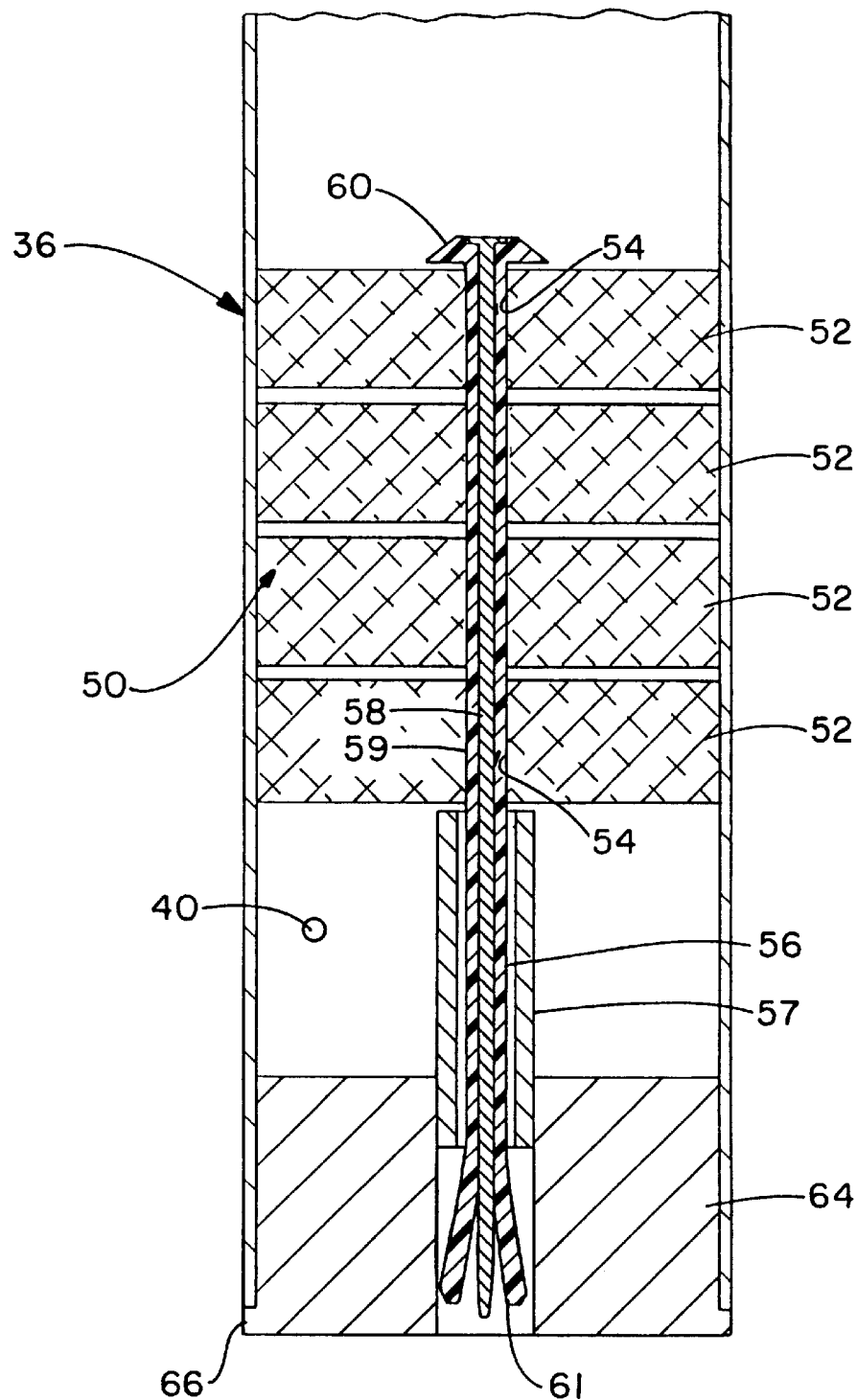
FIG. 2 is an enlarged side sectional view of the bottom end of the isolation tube with the filter of the present invention installed therein.

In the preferred embodiments of the invention, as shown in an enlarged side view in FIG. 2, the filter 50 will be cylindrical with an axial height and a radial diameter selected such that the height to diameter ratio is large enough that the axis of the filter is maintained substantially coaxial with the axis of the tube as the filter sits within the tube 36. In other words, the filter 50 is not able to "yaw" or become cocked in the tube 36, as these would allow short-circuiting of the filter by fluid in the tube. This objective may be achieved in some embodiments by forming the filter 50 from one or more filter elements. Each of these filter elements comprises a cylindrical disk 52 a coarse mesh material suitable for serving as a filter, with an axial aperture 54 through the disk. The disk 52 should have an outside diameter slightly larger than the inside diameter of the tube 36 in which the disk will be placed. Rather than providing the inside surface of the tube 36 with some restraining means for preventing axial movement of the filter 50 in the tube, an axial post 56 may be provided which extends upwardly into the interior of the tube from a bottom end of the tube. The axial post 56 has a cap 60 formed at an upper end, with the cap located axially below the low level point when the axial post is installed in the tube. Along the length of the axial post 56, an enlarged shoulder 62 should be formed, so that the axial post has a smaller diameter between the cap 60 and the shoulder than it has below the shoulder. When the filter 50 is formed on the axial post 56 by stacking one or more disks 52 onto the post and the axial apertures 54 in each of the disks is larger than the diameter of the axial post between the cap and the enlarged shoulder and is smaller than the diameter of either the cap or the enlarged shoulder, the filter 50 will be effectively restrained to axial movement between the enlarged shoulder and the cap.

The axial post 56 should be long enough that the cap 60 is positioned above the top of the tube aperture 40. This prevents any fluid from entering the inside of the tube while bypassing the filter 50. In the preferred embodiments, the axial post is removably mounted in an end cap 64 fitted in the bottom end of the tube 36. This is to allow the easy replacement of filter disks 52 on the axial post 56. In the most preferred embodiment, the end cap 64 has an enlarged flange 66 which allows the end cap to be seated in the interior of the tube 36 at the bottom end. When this embodiment is employed, the removal of the end cap 64 and the associated axial post 56 with the stacked filter elements 52 comprising the filter 50 is quite easy and can be quickly accomplished. In the preferred embodiment as shown in FIG. 2, the axial post comprises a collar portion 57 which is affixed to or is integral with the end cap 64. A rod 58 fitted into a sleeve 59 provides the main body of the axial rod assembly and when a split expandable end 61 is provided on the sleeve, the rod can be used to secure the sleeve into the end cap 64. Of course, cap 60 is formed at the opposite end of sleeve 59.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. In a basin having a pump mounted therein for evacuating liquid from the basin, an improved system for maintaining a liquid level in the basin between a low level point and a high level point comprising:

a level sensing means capable of moving at least between the low level point and the high level point;

a tube disposed in the basin with a longitudinal axis of the tube parallel to a longitudinal axis of the basin such that the tube spans at least the distance between the low level point and the high level point, with the level sensing means positioned within the interior of the tube;

an aperture in the tube below the low level point to permit liquid flow between the basin and the tube; and a filter, positioned in the tube below the low level point.

2. The improved liquid level system of claim 1, wherein the liquid sensing means comprises at least one liquid level sensor, capable of actuating a switch to turn the pump off when at the low level point and actuating a switch to turn the pump on when at the high level point, the liquid level sensor capable of moving between the respective low and high level points as the liquid level in the tube moves between the low and high level points.

3. The improved liquid level system of claim 2, wherein the liquid sensing means comprises at least two liquid level sensor, a first of said at least two liquid level sensors capable of actuating a switch to turn the pump off when the liquid level is at the low level point and a second of the at least two liquid level sensors capable of actuating a switch to turn the pump on when the liquid level is at the high level point.

4. The improved liquid level system of claim 1, wherein the filter substantially fills the interior cross section of the tube along the length of the filter.

5. The improved liquid level system of claim 1 wherein the filter is restrained from upward axial motion within the tube above the low level point.

6. The improved liquid level system of claim 1 wherein the filter comprises a coarse mesh.

7. The improved liquid level system of claim 1 wherein the tube is long enough that a top end of the tube extends above the high level point.

8. The improved liquid level system of claim 7 wherein the top end of the tube is generally closed with an end cap having an aperture allowing communicating of gas from the basin to the interior of the tube.

9. The improved liquid level system of claim 5 wherein the filter has a length less than the distance between the bottom of the aperture and the low level point.

10. The improved liquid level system of claim 9 wherein the filter is cylindrical with a ratio of an axial length to a radial diameter such that the filter has an axis which is maintained substantially coaxial with the axis of the tube as the filter sits within the tube.

11. The improved liquid level system of claim 6 wherein the filter comprises at least one filter element, each said at least one filter element comprising a cylindrical disk of the coarse mesh material with an axial aperture therethrough and a outside diameter slightly larger than the inside diameter of the tube.

12. The improved liquid level system of claim 11 wherein an axial post extends upwardly into the interior of the tube from a bottom end thereof, the axial post having a cap at an upper end thereof.

13. The improved liquid level system of claim 12 wherein the cap on the axial post is axially below the low level point.

14. The improved liquid level system of claim 12 wherein the axial post further has a enlarged shoulder positioned along its length.

15. The improved liquid level system of claim 14 wherein the axial aperture in each of the at least one filter elements is larger than the diameter of the axial post between the cap and the enlarged shoulder and is smaller than the diameter of either the cap or the enlarged shoulder, so that the filter elements are restrained to axial movement between the enlarged shoulder and the cap.

16. The improved liquid level system of claim 12 wherein the cap is positioned above the top of the tube aperture.

17. The improved liquid level system of claim 12 wherein the axial post is mounted in an end cap fitted in the bottom end of the tube.

18. The improved liquid level system of claim 17 wherein the axial post is removably seated in the end cap to allow replacement of the filter elements.

19. The improved liquid level system of claim 17 wherein an enlarged flange around the end cap restrains axial movement of the end cap into the interior of the tube at the bottom end thereof.

* * * * *